(12) United States Patent
Hara et al.

(10) Patent No.: US 6,880,900 B2
(45) Date of Patent: Apr. 19, 2005

(54) BRAKE CONTROL SYSTEM AND METHOD FOR VEHICLE

(75) Inventors: Masahiro Hara, Susono (JP); Toshihisa Nihei, Mishima (JP); Naruyuki Matsui, Gotemba (JP); Masahiro Matsuura, Chiryu (JP)

(73) Assignees: Toyota Jidosha Kabushiki Kaisha, Tokyo (JP); Denso Corporation, Kariya (JP)

( * ) Notice: Subject to any disclaimer, the term of this patent is extended or adjusted under 35 U.S.C. 154(b) by 0 days.

(21) Appl. No.: 10/145,903

(22) Filed: May 16, 2002

(65) Prior Publication Data

US 2002/0180267 A1 Dec. 5, 2002

(30) Foreign Application Priority Data

May 30, 2001 (JP) ........................................ 2001-163525

(51) Int. Cl.$^7$ ................................................ B60T 8/74
(52) U.S. Cl. ........................ 303/170; 303/148; 303/149; 303/155; 303/113.4
(58) Field of Search .................................. 303/155, 170, 303/113.4, 114.1, 116.1, 116.2, 148, 149, 20, DIG. 2, DIG. 3

(56) References Cited

U.S. PATENT DOCUMENTS

| | | | | |
|---|---|---|---|---|
| 4,755,945 A | * | 7/1988 | Kade et al. ................... 701/73 |
| 5,286,100 A | * | 2/1994 | Takayama et al. ........... 303/163 |
| 5,498,071 A | * | 3/1996 | Oikawa et al. ............. 303/149 |
| 5,520,448 A | * | 5/1996 | Okubo ....................... 303/148 |
| 5,934,769 A | | 8/1999 | Brachert et al. |
| 5,944,394 A | * | 8/1999 | Friederichs et al. ........ 303/148 |
| 5,967,629 A | * | 10/1999 | Kubota ....................... 303/186 |
| 6,199,670 B1 | * | 3/2001 | Shirai et al. ................ 188/158 |
| 6,328,388 B1 | | 12/2001 | Mohr et al. |

FOREIGN PATENT DOCUMENTS

| | | |
|---|---|---|
| DE | 40 29 793 A1 | 3/1992 |
| DE | 195 42 657 A | 5/1997 |
| DE | 195 43 582 A1 | 6/1997 |
| DE | 197 07 106 A | 10/1997 |
| EP | WO 01 32487 A | 5/2001 |
| GB | 2 328 258 * | 2/1999 |
| JP | A 4-63755 | 2/1992 |
| JP | 04-244464 | 9/1992 |
| JP | 10-006966 | 1/1998 |

* cited by examiner

Primary Examiner—Douglas C. Butler
Assistant Examiner—Bradley T King
(74) Attorney, Agent, or Firm—Oliff & Berridge, PLC

(57) ABSTRACT

A target wheel cylinder pressure for each wheel is calculated according to an amount of braking operation performed by a vehicle operator. When anti-skid control is required, the wheel cylinder pressure is controlled to be equal to the target wheel cylinder pressure for reducing the brake slip of the wheel. When one of the rear-left and the rear-right wheels is anti-skid controlled, the target wheel cylinder pressure for the other wheel for which the anti-skid control is not performed is set to the same value as the target wheel cylinder pressure for the wheel for which the anti-skid control is performed. Linear valves are controlled based on the target wheel cylinder pressure, controlling the wheel cylinder pressures for the rear-left and the rear-right wheels to have substantially the same value.

30 Claims, 8 Drawing Sheets

BRAKE CONTROL SYSTEM AND METHOD FOR VEHICLE

INCORPORATION BY REFERENCE

The disclosure of Japanese Patent Application No. 2001-163525 filed on May 30, 2001, including the specification, drawings and abstract is incorporated herein by reference in its entirety.

BACKGROUND OF THE INVENTION

1. Field of Invention

The invention relates generally to brake control systems and methods for a vehicle, and more specifically to brake control systems and methods for a vehicle for linearly adjusting a braking force applied to each wheel of the vehicle.

2. Description of Related Art

Japanese Patent Application Laid-Open Publication No. 4-63755 discloses one type of a brake control system for a vehicle such as an automobile. The known type of the brake control system employs a differential pressure control valve by which a wheel cylinder pressure is linearly increased or decreased such that anti-skid control is performed.

In the aforementioned brake control system, current applied to the differential pressure control valve is controlled so as to linearly increase or decrease the wheel cylinder pressure. This may eliminate noise generated during the braking control as compared with the case where the differential pressure control valve is in the form of a switching valve, and is intermittently opened and closed. Furthermore, the above-described brake control system may reduce undesirable phenomenon such as a kick-back.

However, the above-identified publication does not disclose the manner in which the brake control system performs so-called "low select control" performed when the vehicle is running on a road with a surface having a relatively low friction coefficient and the rear-left and rear-right wheels of the vehicle are anti-skid controlled. In the low select control performed during anti-skid control, one pressure mode is selected from pressure increasing, pressure-holding and pressure decreasing modes with respect to rear left and rear right wheels by giving the highest priority to the mode for decreasing the pressure, and giving the lowest priority to the mode for increasing the pressure, and a third priority to the mode for increasing the pressure. Accordingly, the above-described brake control system may be further improved in terms of the low select control such that the braking performance of the vehicle is further improved.

In a conventional brake control system that employs two switching valves for respectively increasing (holding) the pressure and decreasing the wheel cylinder pressure for each wheel so as to control the wheel cylinder pressure, the low select control is performed by selecting one of the left and right rear wheels for which the wheel cylinder pressure should be controlled with the higher priority, measuring a time period for which the switching valves for the selected wheel are opened or closed, and switching the switching valves for the other wheel, that is, the non-selected wheel, in accordance with the open/close period of the selected wheel. As a result, the change amounts of the wheel cylinder pressures for the rear-left and rear-right wheels may be made equal to each other.

However, when a linear valve is used for increasing or decreasing the wheel cylinder pressure, the fact that the response of the linear valve varies by a larger degree compared with the response of a switching valve has to be considered. Even when the linear valve for the non-selected wheel is controlled so that a slope of change in the pressure applied to the non-selected wheel via the linear valve becomes equal to a target slope of change in the pressure applied to the selected wheel, the wheel cylinder pressures of the selected and non-selected wheels are not always increased or decreased synchronously.

The aforementioned problem occurs not only in a hydraulic type brake control system using a linear valve as a control valve, but also occurs in an electric brake control system having an electric actuating device such as an electric motor for pressing a friction member such as a brake pad against a rotating member such as a brake rotor employed in a wheel owing to variations in the response of the actuating device.

SUMMARY OF THE INVENTION

It is an object of the invention to improve a brake control performance of a vehicle. Supposing that a linear valve is employed as a control valve for linearly increasing or decreasing the wheel cylinder pressure of the vehicle, each braking pressure of (pressing force applied to) a pair of right and left wheels and the resultant amount of each change are required to be equal. For example, a pair of wheels including a right wheel and a left wheel have to be low-select controlled as well as anti-skid controlled. The aforementioned requirement may be satisfied by controlling the target wheel cylinder pressure of one of the pair of left and right wheels to be equal to that of the other wheel. As a result, unlike the case where the target slope of change in each pressure is set to an equal value, each braking pressure applied to the pair of left and right wheels and the resultant change amount are set to an equal value, thus improving the braking performance of the vehicle.

According to one aspect of the invention, a braking control system for a vehicle includes a linear valve that adjusts a wheel cylinder pressure of a wheel cylinder provided for each wheel of the vehicle by controlling supply and discharge of a working fluid to and from the wheel cylinder. In addition, a controller determines a target value of the wheel cylinder pressure of each wheel in accordance with a state of the vehicle, and controls the linear valve such that the wheel cylinder pressure becomes equal to the determined target value. When the vehicle is in the predetermined state, the controller further determines a target wheel cylinder pressure of a first wheel of the vehicle on the basis of a rotating state of the first wheel, and sets a target wheel cylinder pressure of a second wheel of the vehicle to a value that is the same as the target wheel cylinder pressure of the first wheel of the vehicle.

According to another aspect of the invention, a braking control system for a vehicle includes an actuator that adjusts a pressing force of a friction member against a rotating member provided in the vehicle, and a controller that determines a target value of the pressing force applied to each wheel in accordance with a state of the vehicle, and controls the actuator to set the pressing force to the determined target value. When the vehicle is in a predetermined state, the controller further determines a target pressing force applied to a first wheel on the basis of a rotating state of the first wheel, and sets a target pressing force of a second wheel to the target pressing force applied to the first wheel.

According to an aspect of the invention, when the vehicle is in a predetermined state, a target wheel cylinder pressure of a first wheel of the vehicle is determined on the basis of a rotating state of the first wheel, and a target wheel cylinder pressure of a second wheel of the vehicle is set to a value that is the same as the target wheel cylinder pressure of the first wheel of the vehicle. Therefore, unlike the case where a target slope of the wheel cylinder pressure of the second wheel is set to a value equal to that of the wheel cylinder pressure of the first wheel, the wheel cylinder pressure for the first and second wheels are controlled to be substantially equal.

When a vehicle is in a predetermined state, the target pressing force applied to the first wheel is determined based on the rotating state of the first wheel, and the target pressing force applied to the second wheel is set to be equal to that of the first wheel. This makes it possible to control the pressing force applied to the second wheel to be equal to the pressing force applied to the first wheel more reliably compared with the case where the target change amount in the pressing force applied to the second wheel is set to be equal to the change amount of the pressing force applied to the first wheel.

According to another aspect of the invention, the first and the second wheels may be a right wheel and a left wheel. When the vehicle is in the predetermined state, each of the wheel cylinder pressure or the pressing force applied to the right and left wheels is controlled to have a substantially equal value with reliability.

The predetermined state of the vehicle may be a state in which the first wheel and the second wheel are anti-skid controlled. Therefore, each of the wheel cylinder pressure or the pressing force applied to the first and second wheels is controlled to have a substantially equal value with reliability.

The controller may limit a change rate of the target wheel cylinder pressure of the second wheel within a predetermined range. The controller may also limit a change rate of the target pressing force applied to the second wheel within a predetermined range. This prevents sharp increase or decrease in the wheel cylinder pressure or the pressing force applied to the second wheel.

A braking control system for a vehicle may further include a master cylinder, a communication control valve provided between the master cylinder and the linear valve, and a high pressure source that supplies the working fluid at a high pressure to a passage between the communication control valve and the linear valve. The linear valve is provided between the master cylinder and the wheel cylinder, and the communication control valve is closed at least when a predetermined control for communication between the master cylinder and the linear valve is started.

The linear valve may include a first linear valve for increasing the wheel cylinder pressure, and a second linear valve for decreasing the wheel cylinder pressure.

The first wheel and the second wheel may comprise a rear-left wheel and a rear-right wheel.

Another aspect of the invention relates to methods of controlling braking of a vehicle as set forth above.

BRIEF DESCRIPTION OF THE DRAWINGS

The invention will be described with reference to the following drawings in which like reference numerals designate like elements and wherein.

DETAILED DESCRIPTION OF PREFERRED EMBODIMENTS

Hereinafter, embodiments of the invention will be described in detail with reference to the accompanying drawings.

Figure 1A:
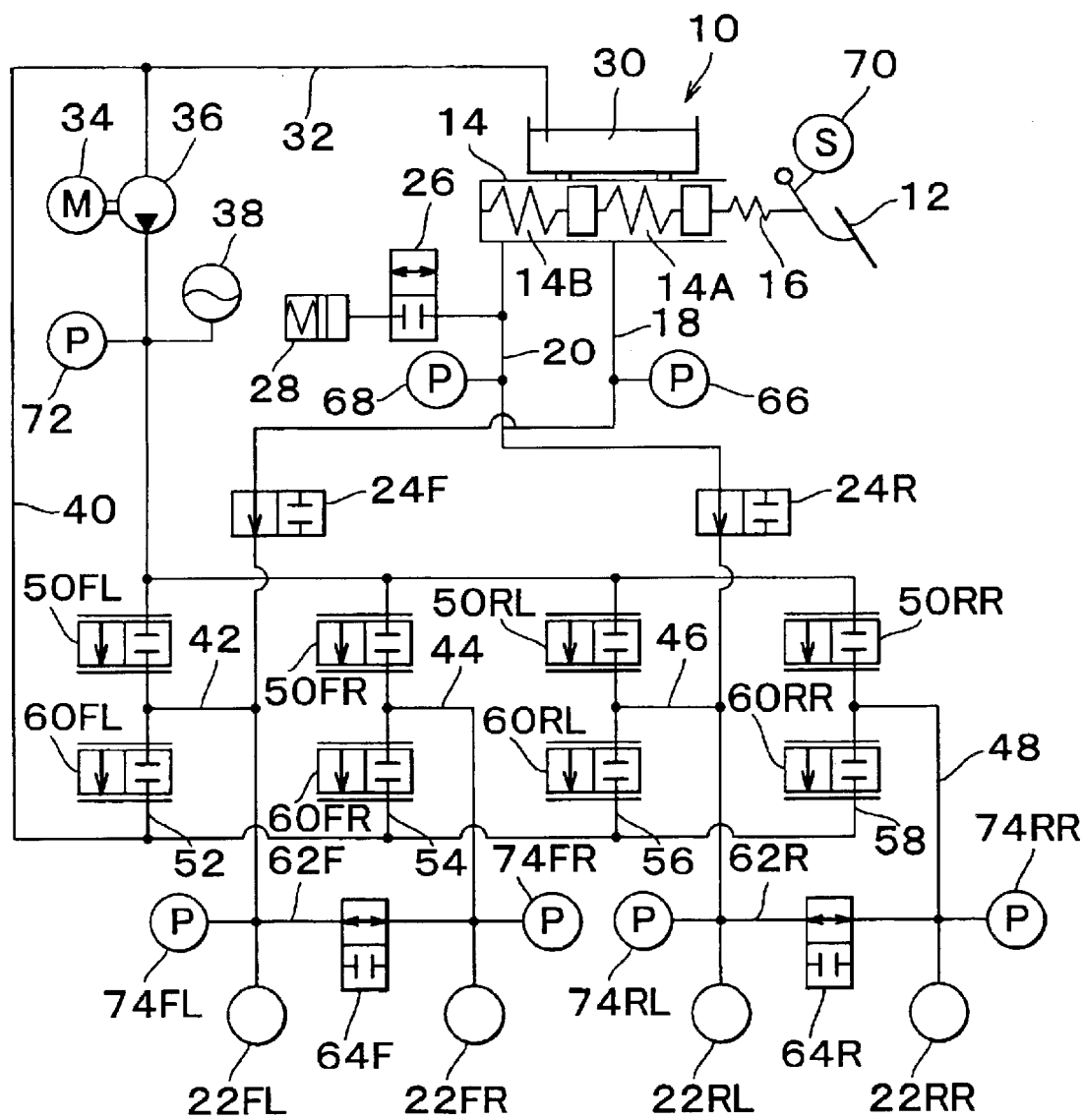
FIG. 1A is a block diagram of an example of a hydraulic circuit in a brake control system for a vehicle according to an embodiment of the invention.
Figure 1B:
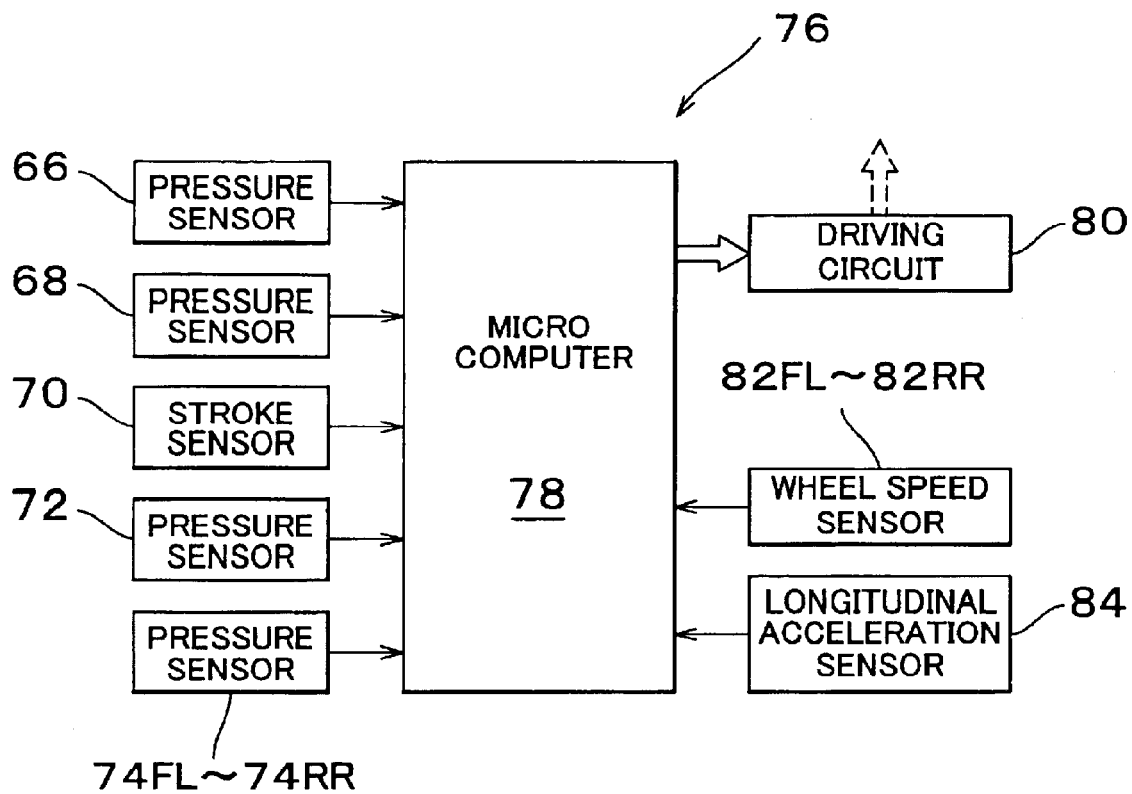
FIG. 1B is a block diagram of an example of an electronic control unit in a brake control system for a vehicle according to an embodiment of the invention.

FIGS. 1A and 1B schematically show a hydraulic circuit and an electronic control unit both employed in a brake control system for a vehicle according to an embodiment of the invention. In FIG. 1A, a solenoid of each solenoid-operated valve is not illustrated.

Referring to FIG. 1A, an electrically controlled hydraulic brake system 10 has a master cylinder 14 which delivers brake oil to the hydraulic circuit under pressure in response to a driver's operation to depress a brake pedal 12. A dry stroke simulator 16 is provided between the brake pedal 12 and the master cylinder 14.

The master cylinder 14 has a first master cylinder chamber 14A and a second master cylinder chamber 14B. A brake pressure supply conduit 18 for front wheels is connected at one end to the first master cylinder chamber 14A, and a brake pressure supply conduit 20 for rear wheels is connected at one end to the second master cylinder chamber 14B. Wheel cylinders 22FL and 22RL for controlling the braking force for a front-left wheel and a rear-left wheel are connected to the other ends of the brake pressure supply conduits 18 and 20, respectively.

Solenoid-operated valves (master cut valves) 24F and 24R of normally-open type are provided at certain points of the brake pressure supply conduits 18 and 20, respectively. The solenoid-operated valves 24F and 24R function as cutoff devices for controlling communication between the first and second master cylinder chambers 14A and 14B and the corresponding wheel cylinders, respectively. In addition, a wet stroke simulator 28 is connected to the brake pressure supply conduit 20 between the master cylinder 14 and the solenoid-operated valve 24R via a normally-closed type solenoid-operated valve 26.

A reservoir 30 is connected to the master cylinder 14, and a pressure supply conduit 32 is connected at one end thereof to the reservoir 30. An oil pump 36 driven by an electric motor 34 is provided at a certain point of the pressure supply conduit 32. An accumulator 38 that accumulates high hydraulic pressure is connected to a portion of the pressure supply conduit 32 located on the discharge side of the oil pump 36. An oil discharge conduit 40 is connected to a portion of the pressure supply conduit 32 that is located between the reservoir 30 and the oil pump 36.

The pressure supply conduit 32 on the discharge side of the oil pump 36 is connected to the brake pressure supply conduit 18 between the solenoid-operated valve 24F and the wheel cylinder 22FL via a hydraulic control conduit 42, and is connected to the wheel cylinder 22FR for a front-right wheel via a hydraulic control conduit 44. The pressure supply conduit 32 is also connected to the brake pressure supply conduit 20 between the solenoid-operated valve 24R and the wheel cylinder 22RL via a hydraulic control conduit 46, and is connected to the wheel cylinder 22RR for a rear-right wheel via a hydraulic control conduit 48.

Electromagnetic linear valves 50FL, 50FR, 50RL, 50RR of normally-closed type are provided at certain points of the hydraulic control conduits 42, 44, 46, 48, respectively. The hydraulic control conduits 42, 44, 46, 48 on the side of the wheel cylinders 22FL, 22FR, 22RL, 22RR with respect to the electromagnetic linear valves 50FL, 50FR, 50RL, 50RR are connected to the oil discharge conduit 40 via hydraulic control conduits 52, 54, 56, 58, respectively. Normally-closed type electromagnetic linear valves 60FL, 60FR, 60RL, 60RR are provided at certain points of the hydraulic control conduits 52, 54, 56, 58, respectively.

The linear valves 50FL, 50FR, 50RL, 50RR function as pressure-increasing control valves for increasing the pressures in the wheel cylinders 22FL, 22FR, 22RL, 22RR, respectively. The linear valves 60FL, 60FR, 60RL, 60RR function as pressure-decreasing control valves for decreasing the pressures in the wheel cylinders 22FL, 22FR, 22RL, 22RR, respectively. These linear valves cooperate with each other to control supply of high-pressure oil from the accumulator 38 to each of the wheel cylinders and discharge of the oil from each wheel cylinder. Thus, the linear valves 50FL, 50FR, 50RL, 50RR, 60FL, 60FR, 60RL and 60RR are valves to control an increase/decrease in pressure.

The pressure supply conduit 18 for the front wheels and the hydraulic control conduit 44 for the front-right wheel are connected to each other via a connecting conduit 62F at their locations close to the corresponding wheel cylinders 22FL and 22FR. A normally-closed type solenoid-operated valve 64F is provided at a certain point of the connecting conduit 62F. The solenoid-operated valve 64F functions as a communication control valve for controlling fluid communication between the wheel cylinders 22FL and 22FR.

Similarly, the pressure supply conduit 20 for the rear wheels and the hydraulic control conduit 48 for the rear-right wheel are connected to each other via a connecting conduit 62R at their locations close to the corresponding wheel cylinders 22RL and 22RR. A normally-closed type solenoid-operated valve 64R is provided at a certain point of the connecting conduit 62R. The solenoid-operated valve 64R functions as a communication control valve for controlling the communication between the wheel cylinders 22RL and 22RR.

As shown in FIG. 1A, a pressure sensor 66 for sensing the pressure in the brake pressure supply conduit 18 as a first master cylinder pressure Pm1 is provided in a portion of the supply conduit 18 between the first master cylinder chamber 14A and the solenoid-operated valve 24F. Similarly, a pressure sensor 68 for sensing the pressure in the brake pressure supply conduit 20 as a second master cylinder pressure Pm2 is provided in the supply conduit 20 between the second master cylinder chamber 14B and the solenoid-operated valve 24R. The first and the second master cylinder pressures Pm1 and Pm2 are detected as values corresponding to a braking force applied by the driver to the brake pedal 12.

The brake pedal 12 is provided with a stroke sensor 70 for sensing a depression stroke St as an amount of displacement of the brake pedal 12 by the driver. A pressure sensor 72 for sensing the pressure in the pressure supply conduit 32 as an accumulator pressure Pa is provided in the brake pressure supply conduit 32 on the discharge side of the oil pump 36.

Pressure sensors 74FL and 74RL are respectively provided in the brake pressure supply conduits 18 and 20 between the solenoid-operated valves 24F and 24R and the wheel cylinders 22FL and 22RL. The pressure sensors 74FL and 74RL function to detect the pressures in the corresponding conduits as pressures Pfl and Prl in the wheel cylinders 22FL and 22RL. In addition, pressure sensors 74FR and 74RR are respectively provided in the hydraulic control conduits 44 and 48 between the solenoid-operated valves 50FR, 50RR and the wheel cylinders 22FR and 22RR. The pressure sensors 74FR and 74RR function to detect the pressures in the corresponding conduits as pressures Pfr and Prr in the wheel cylinders 22FR and 22RR.

The solenoid-operated valves 24F and 24R, the solenoid-operated valve 26, the electric motor 34, the linear valves 50FL, 50FR, 50RL, 50RR, the linear valves 60FL, 60FR, 60RL, 60RR, and the solenoid-operated valves 64F and 64R are controlled by an electronic control unit 76 as will be described in detail below. The electronic control unit 76 includes a microcomputer 78 and a drive circuit 80.

Each solenoid-operated valve, each linear valve and the electric motor 34 receive driving current via the drive circuit 80 (not shown in FIG. 1A). In particular, during non-control in which the driving current is not being supplied to the solenoid-operated valves, the linear valves or the electric motor 34, the solenoid-operated valves 24F and 24R, and the solenoid-operated valves 64F and 64R are kept open and the solenoid-operated valve 26, the linear valves 50FL, 50FR, 50RL, 50RR, and the linear valves 60FL, 60FR, 60RL, 60RR are kept closed (non-control mode).

The microcomputer 78 shown in FIG. 1B has, for example, a central processing unit (CPU), a read only memory (ROM), a random access memory (RAM), and an input/output port device, having a common configuration in which those elements are connected with each other via a bi-directional common bus.

The microcomputer 78 receives signals indicative of the first master cylinder pressure Pm1 and the second master cylinder pressure Pm2 from the pressure sensors 66 and 68, respectively, a signal indicative of the depression stroke St of the brake pedal 12 from the stroke sensor 70, a signal indicative of the accumulator pressure Pa from the pressure sensor 72, and signals indicative of the pressure Pi (i=fl, fr, rl, rr) in the wheel cylinders 22FL through 22RR from the pressure sensors 74FL through 74RR, respectively.

Also, the microcomputer 78 receives signals from wheel speed sensors 82FL through 82RR indicative of the wheel speed Vwi (i=fl, fr, rl, rr) of the front-left and front-right wheels and the rear-left and rear-right wheels, as well as a signal from a longitudinal acceleration sensor 84 indicative of the longitudinal acceleration Gx of the vehicle.

The microcomputer 78 stores the brake control flow routine shown in FIGS. 2 and 3, which will be described later. The microcomputer 78 estimates an amount of required braking by the driver based on the master cylinder pressures Pm1 and Pm2 detected by the pressure sensors 66 and 68 and the depression stroke St detected by the stroke sensor 70, and then calculates a final target deceleration Gt of the vehicle based on the estimated amount of required braking. The microcomputer 78 then calculates a target wheel cylinder pressure (referred to as "target WC pressure" in the figure) Pti (i=fl, fr, rl, rr) for each wheel based on the calculated final target deceleration Gt. The microcomputer 78 then calculates a target driving current It for the linear valves 50FL through 50RR or 60FL through 60RR based on the difference between the calculated target wheel cylinder pressure Pti and the actual wheel cylinder pressure Pi. The microcomputer 78 then controls the wheel cylinder pressure for each wheel so that it becomes equal to the target wheel cylinder pressure Pti by supplying the driving current to each linear valve based on the calculated target driving current It.

In this case, the microcomputer 78 controls the opening amount of the linear valves 50FL, 50FR, 50RL, 50RR according to the target wheel cylinder pressure Pti when the brake control mode is at the increase mode for increasing the wheel cylinder pressure. Further, the microcomputer 78 controls the opening amount of the linear valves 60FL, 60FR, 60RL, 60RR according to the target wheel cylinder pressure Pti when the brake control mode is at the decrease mode for decreasing the wheel cylinder pressure. Moreover, the microcomputer 78 keeps the linear valves 50FL through 50RR and 60FL through 60RR closed when the brake control mode is at the maintain mode for maintaining the wheel cylinder pressure.

Furthermore, the microcomputer 78 estimates a vehicle body speed Vb using a method well known in the technical field based on each wheel speed Vwi, as will be described later, and calculates a brake slip amount SLi (i=fl, fr, rl, rr) as the difference between the estimated vehicle body speed Vb and the wheel speed Vwi for each wheel. The microcomputer 78 then determines whether the conditions for starting anti-skid control have been fulfilled for each wheel based on the calculated brake slip amount SLi and the like, and calculates the target wheel cylinder pressure Pti for the relevant wheel based on a vehicle deceleration Gxb, which is based on the forward or reverse acceleration Gt of the vehicle, and the brake slip amount SLi when the conditions for starting the anti-skid control (referred to as "ABS control" in the figure) have been fulfilled. The microcomputer 78 then reduces the brake slip amount by performing anti-skid control such that the wheel cylinder pressure for each wheel becomes equal to the target wheel cylinder pressure Pti.

In particular with the illustrated exemplary embodiment, the microcomputer 78 calculates a target increase/decrease pressure slope (Pti) of the wheel cylinder pressure based on the vehicle deceleration Gxb and the brake slip amount SLi such that the target increase/decrease pressure slope (Pti (i=fl, fr, rl, rr)) of the wheel cylinder pressure becomes larger as the vehicle deceleration Gxb or brake slip amount SLi is increased. The microcomputer 78 takes the most recent target wheel cylinder pressure as Ptfi and the cycle time of the routine shown in FIG. 2 as $\Delta T$, and calculates the target wheel cylinder pressure Pti of the wheel using equation (1) below when starting anti-skid control, and using equation (2) below after the start of anti-skid control until the conditions for ending anti-skid control are fulfilled.

$$Pti = Pi + \Delta Pti \Delta T \qquad (1)$$

$$Pti = Ptfi + \Delta Pti \Delta T \qquad (2)$$

When both rear-left and rear-right wheels of the vehicle are anti-skid controlled in the state where the vehicle is running on a road having a relatively low friction coefficient at a low deceleration rate, one of the target wheel cylinder pressures of the rear-left and the rear-right wheels, which is lower than the other is determined as being the target wheel cylinder pressure, and the other one of the target wheel cylinder pressure is then controlled into the determined target wheel cylinder pressure value. The low select control for controlling the braking force of the rear-left and the rear-right wheels, thus, can be executed.

The ECU 76 drives the electric motor 34 to operate the oil pump 36 based on the accumulator pressure Pa detected by the pressure sensor 72 as necessary such that the pressure within the accumulator is maintained at a value that is equal to or greater than a lower limit value and is equal to or less than the upper limit value.

Next, a brake control routine of an embodiment will be described with reference to a flowchart shown in FIG. 2. The control routine according to the above-described embodiment starts by turning an ignition switch on and is repeatedly executed at a predetermined time interval. Although not shown in FIG. 2, the solenoid-operated valve 26 is opened, the solenoid-operated valves 24F, 24R, 64F, 64R are closed, and the oil pump 36 is driven by the electric motor 34 at the start of the control.

Figure 4:
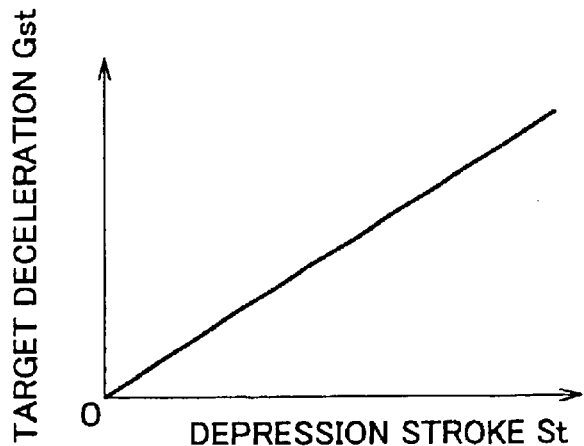
FIG. 4 is a graph showing a relationship between a depression stroke St and a target deceleration Gst.

In step S10, signals indicating the first master cylinder pressure Pm1 and the second master cylinder pressure Pm2 detected by the pressure sensors 66 and 68, respectively, are read. In step S20, a target deceleration Gst is calculated based on the depression stroke St detected by the stroke sensor 70 in accordance with a map shown in FIG. 4.

Figure 5:
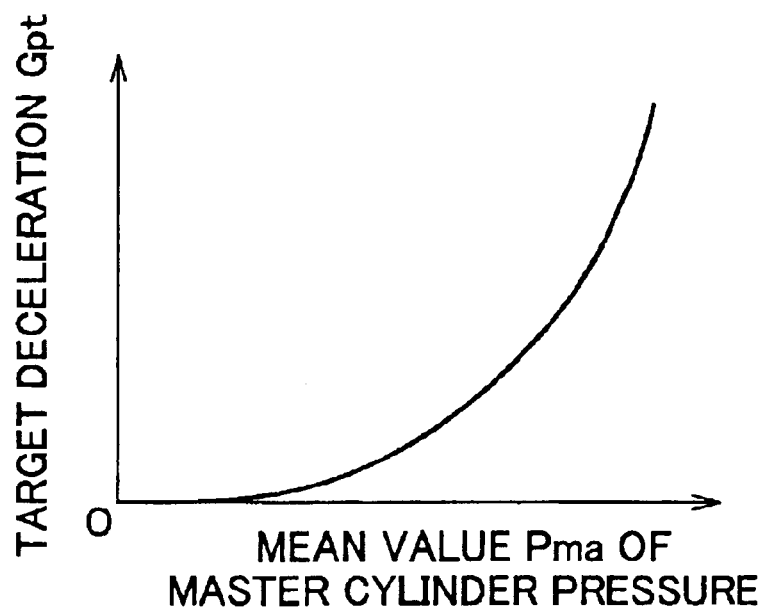
FIG. 5 is a graph showing a relationship between a mean value Pm of a master cylinder pressure and a target deceleration Gpt.

In step S30, a mean value Pma of the first master cylinder pressure Pm1 and the second cylinder pressure Pm2 is calculated. In Step S40, a target deceleration Gpt is calculated based on the mean value Pma in accordance with a map shown in FIG. 5.

Figure 6:
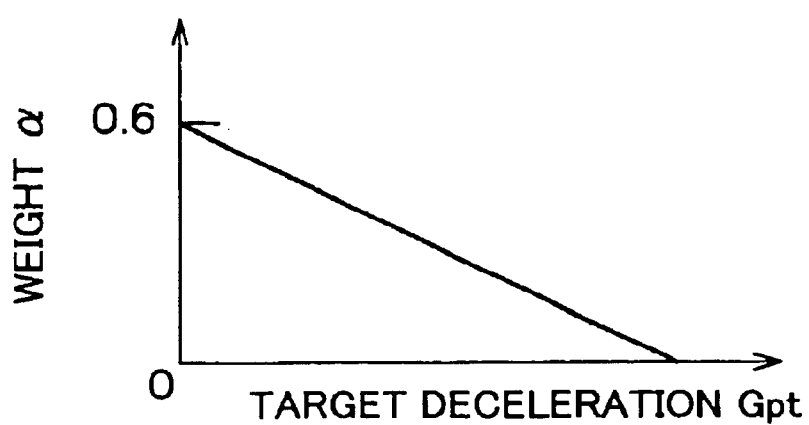
FIG. 6 is a graph showing a relationship between a most recently calculated final target deceleration Gpt and a weight a applied to the target deceleration Gpt.

In step S50, a weight $\alpha(0 \leq \alpha \leq 0.6)$ for the target deceleration Gst is calculated based on the target deceleration Gpt in accordance with a map shown in FIG. 6. In step S60, a final target deceleration Gt is calculated as the weighted sum of the target deceleration Gpt and the target deceleration Gst using the equation (3) as shown below. In the embodiment, the weight $\alpha$ is set to be in a range from 0 to 0.6, that is, $0 \leq \alpha \leq 0.6$. However, the upper limit value of the weight $\alpha$ is not limited to 0.6, but can be any value so long as the weight $\alpha$ ranges from 0 to 1, that is, $0 \leq \alpha \leq 1$.

$$Gt = \alpha Gst + (1 - \alpha) Gpt \qquad (3)$$

In step S70, the target wheel cylinder pressure Pti (i=fl, fr, rl, rr) of each pair of front-left, front-right, and rear-left, rear-right wheels is calculated based on the final target deceleration Gt using equations (4) and (5), respectively.

$$Ptfl = Ptfr = Kf \times Gt \qquad (4)$$

$$Ptrl = Ptrr = Kr \times Gt \qquad (5)$$

where Kf, Kr represent coefficients of the target wheel cylinder pressures of the left and right front wheels and the left and right rear wheels with respect to the final target deceleration Gt.

The control scheme in steps S80 through step S170 is executed for each wheel in time sequence, for example, in a sequential order of the front-left, front-right, rear-left, and rear-right wheels. In step S80, it is determined whether one of the front-left, front-right, rear-left, and rear-right wheels is required to be anti-skid controlled. When NO is obtained in step S80, the process proceeds to step S170. When YES is obtained in step S80, the process proceeds to step S110 in which the target wheel cylinder pressure Pti during the anti-skid control is calculated according to a flowchart shown in FIG. 3.

In step S120, it is determined whether the rear-left wheel or the rear-right wheel is to be anti-skid controlled. When NO is obtained in step S120, the process proceeds to step S170. When YES is obtained, the process proceeds to step S130 in which it is determined whether the other wheel of the rear-right wheel and the rear-left wheel determined in step S120 is under the anti-skid control. When NO is obtained in step S130, the process proceeds to step S170. When YES is obtained in step S130, the process proceeds to step S140.

In step S140, it is determined whether a vehicle deceleration Gxb is equal to or less than a reference value Gxbo (a positive constant). When NO is obtained in step S140, the process proceeds to step S170. When YES is obtained in step S140, the process proceeds to step S150 in which one of the target wheel cylinder pressures Ptrl and Ptrr, which has a smaller value is set as being the target wheel cylinder pressure, and the other one of the target wheel cylinder pressures Ptrl and Ptrr is set to the smaller value.

In step S170, the wheel cylinder pressure Pi is controlled into the target wheel cylinder pressure Pti by controlling the linear valves 50FL to 50RR, and 60FL to 60RR based on the difference between the target wheel cylinder pressure Pti and the actual wheel cylinder pressure Pi. The process then returns to step S10.

Next, a routine for calculating a target wheel cylinder pressure during anti-skid control in the aforementioned embodiment will be described with reference to a flowchart shown in FIG. 3.

Figure 3:
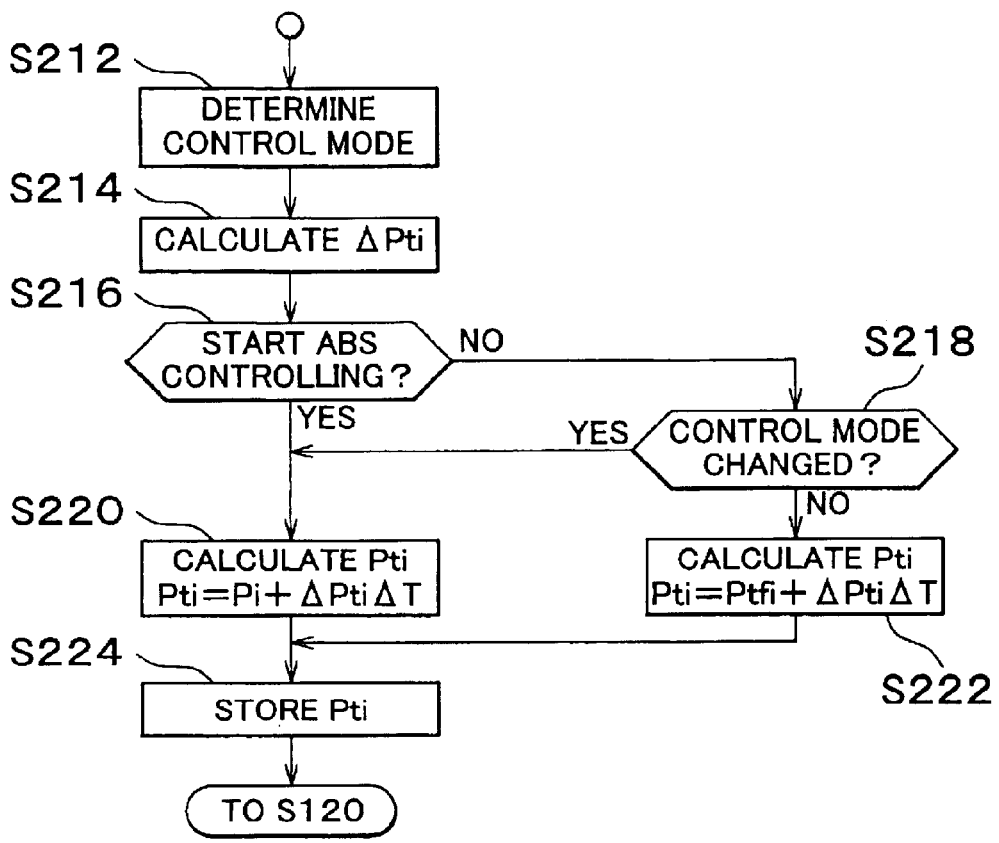
FIG. 3 is a flowchart showing a routine for calculating a target wheel cylinder pressure during anti-skid control.

Referring to FIG. 3, in step S212, a brake control mode is selected from the pressure-increasing mode, the pressure-holding mode, and the pressure-decreasing mode by a known method based on wheel acceleration, for example, a time derivative value Vwdi of the wheel speed Vwi, and the braking slip amount SLi of the wheel. Then in step S214, the target pressure increase/decrease slope ΔPt of the wheel cylinder pressure is calculated based on the brake control mode, the vehicle deceleration Gxb, and the braking slip amount SLi of the wheel in accordance with a map (not shown).

In this case, when the pressure-increasing mode is selected as the braking control mode, the target pressure increase/decrease slope ΔPt is calculated to a positive value that becomes larger as the vehicle deceleration Gxb or the braking slip amount SLi of the wheel increases. When the pressure-decreasing mode is selected as the braking control mode, the target pressure increase/decrease slope ΔPt is calculated to a negative value that becomes smaller as the vehicle deceleration Gxb or the brake slip amount SLi of the wheel decreases. When the pressure-holding mode is selected, the target pressure increase/decrease slope ΔPt is set to 0.

In step S216, it is determined whether the anti-skid control is ready for start. When YES is obtained in step S216, the process proceeds to step S220. When NO is obtained in step S216, i.e., it is determined that the anti-skid control already has been started, the process proceeds to step S218.

In step S218, it is determined whether the brake control mode has been changed, for example, from the pressure-decreasing mode to the pressure-increasing mode. When YES is obtained in step S218, the process proceeds to step S220 in which the target wheel cylinder pressure Pti is calculated using the equation (1). When NO is obtained in step S218, the process proceeds to step S222 in which the target wheel cylinder pressure Pti is calculated using the equation (2). Then in step S224, the target wheel cylinder pressure Pti calculated either in step S220 or step S222 is stored in a memory such as RAM. The control scheme then returns to step S120.

In the foregoing embodiment, the target wheel cylinder pressure Pti for each wheel is calculated according to the amount of braking operation performed by the driver in step S20 through step S70. When the anti-skid control is required, YES is obtained in step S80. The process proceeds to step S110 in which the target wheel cylinder pressure Pti for the anti-skid control is calculated.

Particularly, when the target wheel cylinder pressure Pti for the anti-skid control is calculated, the brake control mode is determined among the pressure-increasing mode, the pressure-decreasing mode, and the pressure-holding mode in step S212 as shown in the flowchart of FIG. 3. Then in step S214, the target pressure increase/decrease slope ΔPt is calculated based on the determined brake control mode, the vehicle deceleration Gxd, and the brake slip amount SLi of the wheel. When it is currently at the start of the anti-skid control, YES is obtained in step S216. The process then proceeds to step S220 in which the target wheel cylinder pressure Pti is calculated using the equation (1). When the anti-skid control has already been started, NO is obtained in step S216.

In the case where the anti-skid control has already been started, that is, NO is obtained in step S216, and the brake control mode has not been changed, NO is obtained in step S218. The process proceeds to step S222 in which the target wheel cylinder pressure Pti is calculated using the equation (2). Upon change in the brake control mode, YES is obtained in step S218, and the process proceeds to step S220. In step S220, the target wheel cylinder pressure Pti is calculated using the equation (1).

Figure 2:
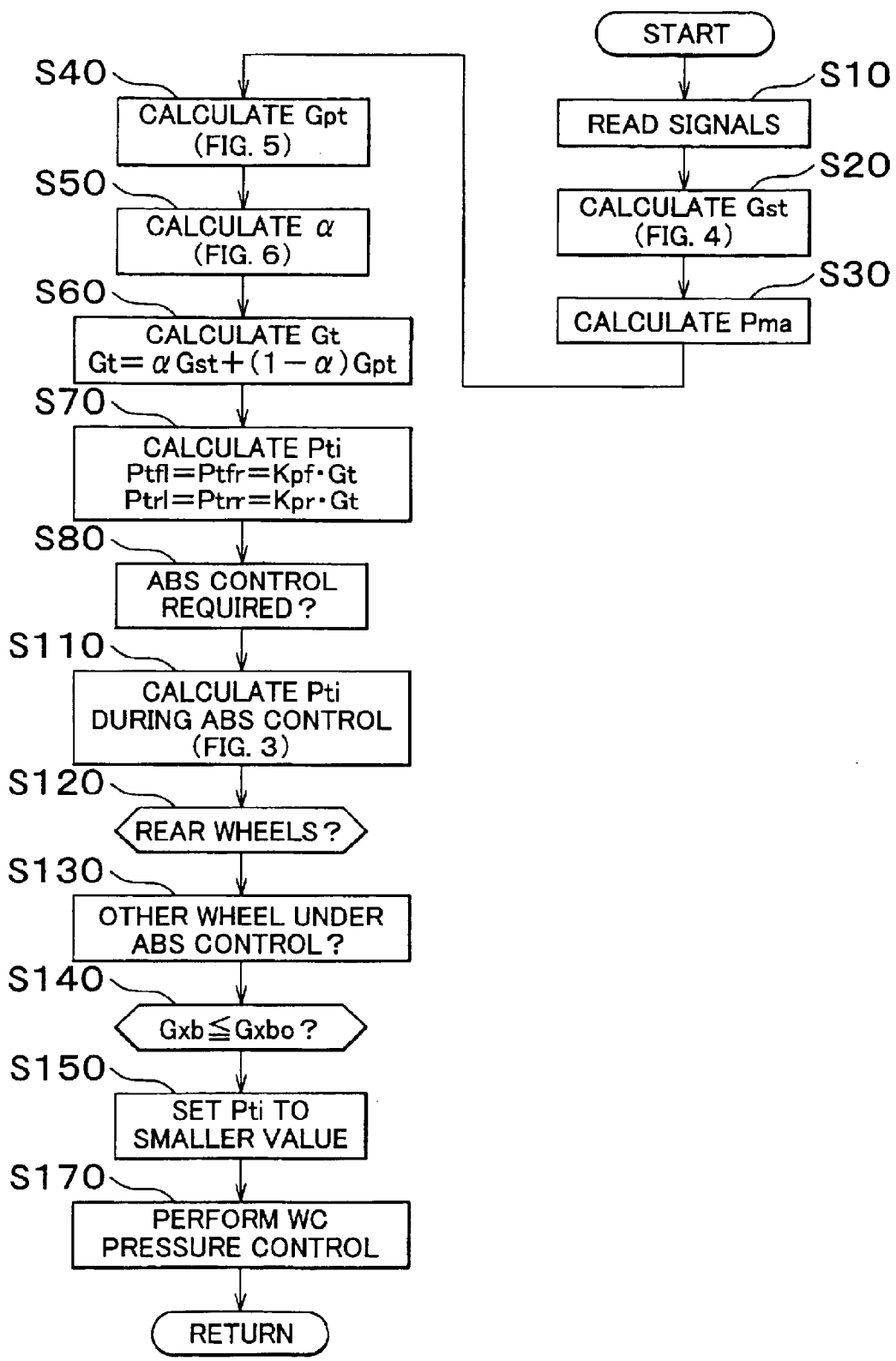
FIG. 2 is a flowchart showing a brake control routine.

When the anti-skid control for the wheel to be controlled is not required, NO is obtained in step S80 shown in FIG. 2. The process then proceeds to step S170 in which the wheel cylinder pressure is controlled according to the amount of braking operation performed by the driver.

Referring to FIG. 2, when the anti-skid control for one of the wheels to be controlled, i.e., the rear-left wheel or the rear-right wheel, is required, and the other one is currently anti-skid controlled, YES is obtained in steps S120 and S130. Then in step S150, the target wheel cylinder pressure Pti is set to the cylinder pressure either for the rear left wheel or the rear right wheel, which has a smaller value.

In the embodiment, when both the rear-left and the rear-right wheels are anti-skid controlled, and the road surface friction coefficient is low, the target wheel cylinder pressures Ptrl and Ptrr for the rear-left wheel and the rear-right wheel are set to the value corresponding to either Ptrl or Ptrr, whichever has a smaller value. Accordingly the low-select control is performed by controlling the wheel cylinder pressures for the rear-left and rear-right wheels to have the same value. It is, thus, possible to control the brake pressures for the rear-left and rear-right wheels to be equal more effectively as compared with the case in which, for example, the target pressure increase/decrease slope ΔPtrl and ΔPtrr of the wheel cylinder pressures for the rear-left and rear-right wheels are set to one of those slopes having a smaller value.

Figure 7:
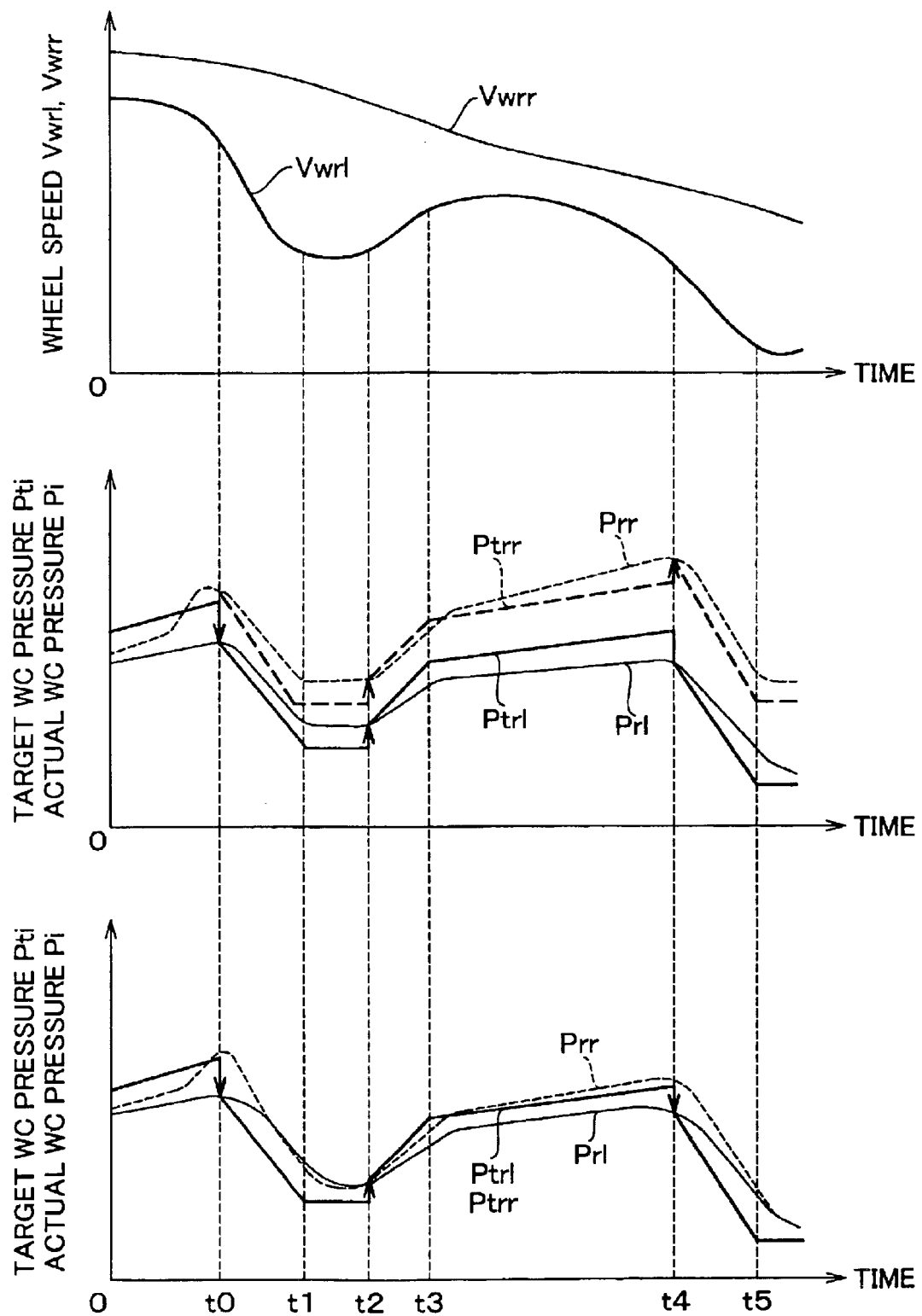
FIG. 7 shows charts representing changes in the rotating speeds of the wheels, and target wheel cylinder pressures with respect to time.

FIG. 7 shows each change in the target wheel cylinder pressure Pti and the actual wheel cylinder pressure Pi in the aforementioned embodiment and the comparative example in the case where both the rear-left and the rear-right wheels are anti-skid controlled, and the low select control is performed.

Referring to FIG. 7, the upper chart shows the change in the wheel speed Vwrl for the rear-left wheel and the wheel speed Vwrr for the rear-right wheel. In the figure, upon start of the anti-skid control at a time t0, the wheel cylinder pressure is decreased from the time t0 to time t1, and is held from the time t1 to time t2. Then, the wheel cylinder pressure is increased at a relatively large pressure increase slope from the time t2 to time t3, increased at a relatively small pressure increase slope from the time t3 to time t4, decreased from the time t4 to time t5, and held from time t5.

The chart in the middle of FIG. 7 shows an example for controlling the wheel cylinder pressure Prr for the rear-right wheel by copying the target pressure increase/decrease slope ΔPtrl. In this case, the wheel cylinder pressure Prr for the rear-right wheel increases or decreases relative to the change in the wheel cylinder pressure Prl for the rear-left wheel. However, as the difference between the wheel cylinder pressures Prr and Prl becomes large, a relatively large yaw moment is exerted to the vehicle. As a result, running stability of the vehicle tends to be degraded.

Referring to the lower chart of FIG. 7 representing the foregoing embodiment, upon start of the anti-skid control at the time t0, the target wheel cylinder pressure Ptrr for the rear-right wheel is kept to a value that is the same as the target wheel cylinder pressure Ptrl for the rear-left wheel until the end of the anti-skid control. Accordingly the wheel cylinder pressure for the rear-right wheel is controlled to be substantially the same as the wheel cylinder pressure Prl for the rear-left wheel. Therefore the running stability of the vehicle running on the road having a surface with a relatively low friction coefficient can be reliably improved.

Figure 8:
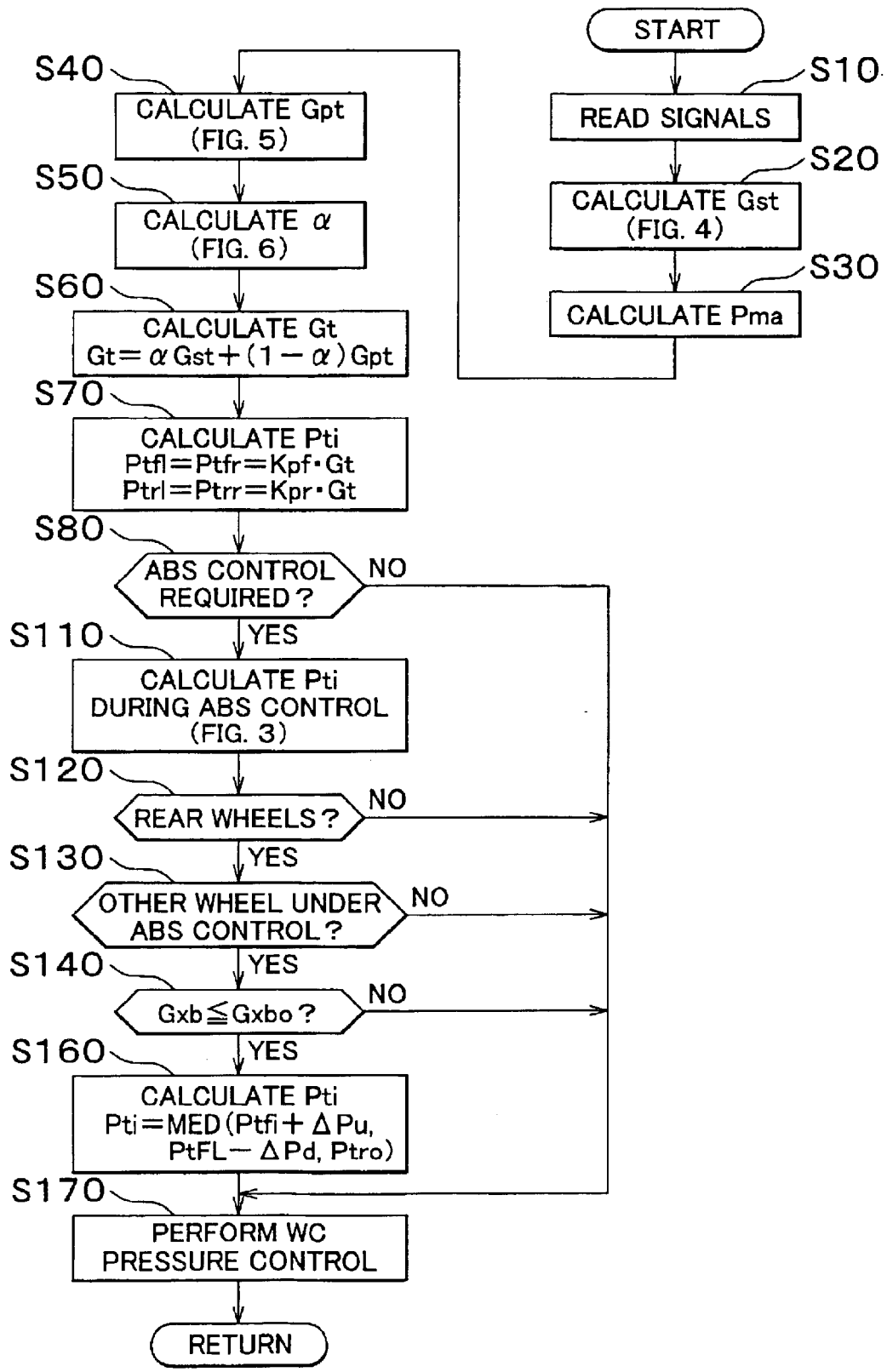
FIG. 8 is a flowchart showing a brake control routine in a brake control system for a vehicle according to another embodiment of the invention.

FIG. 8 is a flowchart of a brake control routine in a brake control system for a vehicle according to another embodiment of the invention. The control according to the flowchart shown in FIG. 8 is started by turning an ignition switch (not shown) on and is repeatedly performed at predetermined time intervals. Further, steps in FIG. 8 which correspond to like steps in FIG. 2 are numbered with the same step numbers as their corresponding steps in FIG. 2.

In this embodiment, when YES is obtained in step S130, i.e., when it is determined that the other one of the rear-left wheel or the rear-right wheel is anti-skid controlled, Ptfi is set to the value of the previous target wheel cylinder pressure. Then ΔPd (positive integer) is set to the limit value of the pressure-decreasing slope, and Ptro is set to the target wheel cylinder pressure of the other one of the rear-left wheel and the rear-right wheel. In step S160, the target wheel cylinder pressure Pti is calculated using the equation (6) as shown below.

$$Pti=MED(Ptfi+\Delta Pu, Ptfi-\Delta Pd, Ptro) \quad (6)$$

where MED represents an intermediate value selected among those identified in the equation (6), and "i" becomes "rl" when the relevant wheel is the rear-left wheel, and becomes "rr" when the relevant wheel is the rear-right wheel.

According to the embodiment, when the rear-left and the rear-right wheels are anti-skid controlled and the low-select control is performed, the pressure increasing slope of the target wheel cylinder pressure for the wheel for which the low-select control is performed is limited to ΔPu. In addition, the pressure decreasing slope is limited to ΔPd. Therefore, it is possible to reliably prevent a sharp increase or decrease in the wheel cylinder pressure for the wheel for which the low-select control is performed, especially hunting is avoided.

Figure 9:
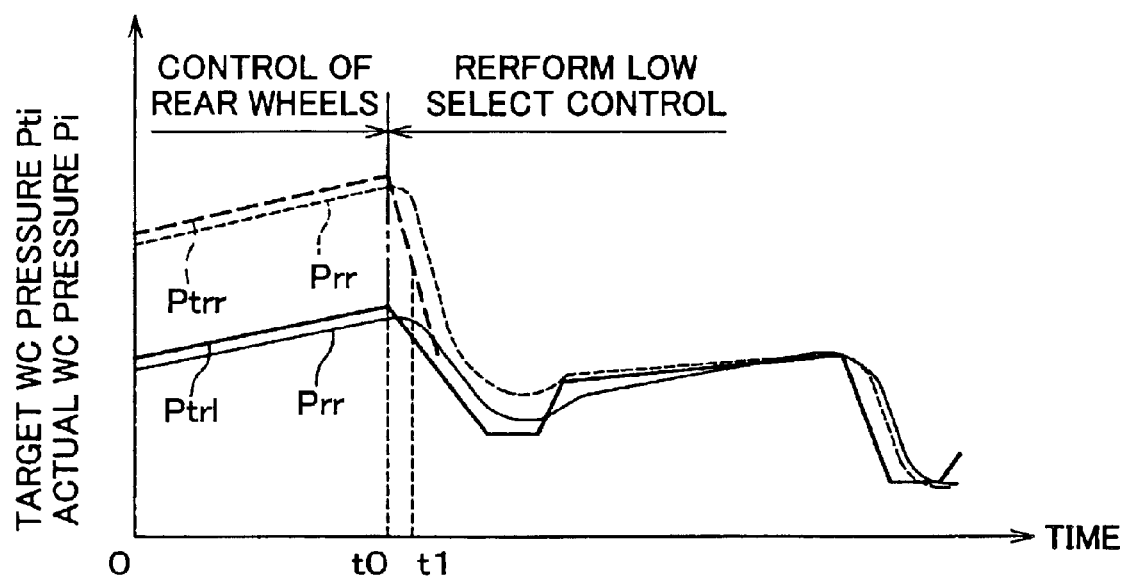
FIG. 9 is an explanatory view showing each change in the target wheel cylinder pressure Pti and the actual wheel cylinder pressure Pi with respect to each embodiment.

FIG. 9 shows each change in the target wheel cylinder pressure Pti and the actual wheel cylinder pressure Pi with respect to the aforementioned embodiments in the case where the rear-left and the rear-right wheels are anti-skid controlled independently until the time t1, and subsequently the low-select control is started at the time t1.

In one of the embodiments, the target wheel cylinder pressure Ptrr for the rear-right wheel is set to the same value as that of the target wheel cylinder pressure Ptrl for the rear-left wheel at the time t1 upon start of the low-select control. If the difference between the wheel cylinder pressures Prl for the rear-left wheel and Prr for the rear-right wheel is large before the time t1, the wheel cylinder pressure Prr for the rear-right wheel sharply increases immediately after an elapse of the time point t1. This may cause a sharp drop in the braking force applied to the rear-right wheel or hunting in the wheel cylinder pressure Prr.

In another embodiment, the target wheel cylinder pressure Ptrr for the rear-right wheel to be low-select controlled may be gently decreased by limiting the pressure decrease slope of Ptrr to ΔPd. According to this embodiment, once the target wheel cylinder pressure Ptrr for the rear-right wheel becomes the same value as that of the target wheel cylinder pressure Ptrl for the rear-left wheel at the time point t2, Ptrr is controlled to be set to the same value as that of Ptrl subsequently. Accordingly this may prevent the sharp decrease in the wheel cylinder pressure in the rear-right wheel and the resultant sharp drop in the braking force applied to the rear-right wheel and the hunting in the wheel cylinder pressure.

In each of the aforementioned embodiments, the actual wheel cylinder pressure Pi is used for calculating the target wheel cylinder pressure Pti at start of the anti-skid control. Accordingly the subsequent target wheel cylinder pressure Pti will be calculated on the basis of the previously obtained target wheel cylinder pressure Ptfi. This makes it possible to set the target wheel cylinder pressure Pti at start of the anti-skid control to a value that is smaller than the actual wheel cylinder pressure Pi and is appropriate in accordance with a slip state of the wheel. As a result, the wheel cylinder pressure at the start of the anti-skid control can be appropriately decreased without delay, and the subsequent target wheel cylinder pressure Pti can be set to the appropriate value that corresponds to the slip state of the wheel. The actual wheel cylinder pressure Pi may be accurately controlled in accordance with the slip state of the wheel, thus realizing the appropriate and effective anti-skid control.

In the aforementioned embodiments, the actual wheel cylinder pressure Pi is still used for calculating the target wheel cylinder pressure Pti even when the braking control mode changes during the anti-skid control. Unlike the control in which the previously obtained target wheel cylinder pressure Ptfi is used for calculating the new target wheel cylinder pressure Pti upon change in the braking control mode, the aforementioned embodiments allow the target wheel cylinder pressure Pti to be set at an appropriate value in accordance with the slip state of the wheel. Accordingly the wheel cylinder pressure can be appropriately and effectively controlled in accordance with the slip state of the wheel.

While the invention has been described in detail with reference to specific embodiments, it will be apparent to those skilled in the art that the invention is not limited to the aforementioned embodiments, and that various changes and modifications may be made within the scope of the invention.

The aforementioned embodiments employ the braking control system of a hydraulic type in which the braking force is increased or decreased by increasing or decreasing the wheel cylinder pressure. However, an electric braking control system having an electric actuator, for example, an electric motor which presses a friction member such as a brake pad against a rotating member such as a brake rotor mounted on the wheel may be employed. In the foregoing case, the target wheel cylinder pressure and the actual wheel cylinder pressure may be replaced by the target pressing force and the actual pressing force, respectively, and the target pressure increase/decrease slope may be replaced by the target force increase/decrease slope. Further the pressure increase/decrease of the brake control mode is replaced by the pressing force increasing/decreasing mode.

In the aforementioned embodiments, the final target deceleration Gt as the amount of braking operation performed by the vehicle operator is calculated on the basis of the mean value Pma of the master cylinder pressure and the stroke St of the brake pedal. However, the amount of braking operation performed by the vehicle operator may be calculated by a method well known in the relevant technical field.

In the aforementioned embodiments, the predetermined state represents the state where one of the rear-left wheel and the rear-right wheel is anti-skid controlled and the other one of the rear-left wheel and the rear-right wheel is not anti-skid controlled. The predetermined state of the vehicle also can be an arbitrary state in which each wheel cylinder pressure of a pair of the left and right wheels has substantially the same value, when an abnormality occurs in a pressure sensor for detecting one of the wheel cylinder pressures for a pair of wheels. In the foregoing case, the pair of right and left wheels may be not only a pair including the rear-left wheel and the rear-right wheel, but also any combination of the wheels is possible.

In the foregoing embodiments of the invention, when the vehicle is in the predetermined state, a target wheel cylinder pressure for a first wheel is determined on the basis of a rotating state of the first wheel, and a target wheel cylinder pressure for a second wheel is set to the same value as that of the target wheel cylinder pressure for the first wheel. Unlike the generally employed control process in which the target pressure increase/decrease slope of the wheel cylinder pressure for the second wheel is set to the same value as that of the target pressure increase/decrease slope for the first wheel, the embodiments may allow the wheel cylinder pressures of the first and the second wheels to have the same values.

In the foregoing embodiments of the invention, when the vehicle is in the predetermined state, a target pressing force to the first wheel is determined on the basis of the rotating state of the first wheel, and the target pressing force to the second wheel is set to have the same value as that to the first wheel. Unlike the general control process in which the target force increase/decrease slope for the second wheel is set to have the same value as that of the target force increase/decrease slope for the first wheel, the embodiments of the invention may allow each pressing force applied to the first and the second wheels to have substantially the same values.

In the foregoing embodiments, the first and the second wheels are a left wheel and a right wheel. When the vehicle is in the predetermined state, each wheel cylinder pressure of, or the pressing force to, the left and right wheels may be set to substantially the same values. This may prevent unnecessarily excessive yaw moment from being exerted to the vehicle.

In the foregoing embodiments, the wheel cylinder pressure of the first and the second wheels under the anti-skid control or the pressing force applied thereto is controlled to have the same value. Thus, the wheel cylinder pressures or the pressing forces for the left and right wheels are controlled to be the lower one of the wheel cylinder pressures or the pressing forces for the two wheels. Therefore, in the case where the driver performs a relatively strong braking operation when the road surface friction coefficient is relatively low, an unnecessary excessive yaw moment can be effectively prevented from being applied to the vehicle.

In the foregoing embodiments, the sharp increase/decrease in the wheel cylinder pressure of, or the pressing force to, the second wheel can be reliably prevented. As a result, the abrupt change in the braking force, and hunting in the wheel cylinder pressure or the pressing force owing to the sharp increase/decrease in the wheel cylinder pressure or the pressing force may be prevented effectively.

In the illustrated embodiment, the apparatus is controlled by the controller (e.g., the electronic control unit 76), which is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A braking control system for a vehicle, comprising:
   first and second linear valve assemblies, each of which adjusts a wheel cylinder pressure of a corresponding wheel cylinder provided for first and second wheels of the vehicle by controlling supply and discharge of a working fluid to and from the corresponding wheel cylinder; and
   a controller that:
      determines a target value of the wheel cylinder pressure of the first and second wheels in accordance with a state of the vehicle, and controls the first and second linear valve assemblies such that the wheel cylinder pressure of the first and second wheels becomes equal to the determined target value;
      determines a target wheel cylinder pressure of the first wheel of the vehicle on the basis of a rotating state of the first wheel when the vehicle is in a predetermined state, wherein the target wheel cylinder pressure of the first wheel equals a pressure plus a target pressure slope multiplied by cycle time, the pressure being the wheel cylinder pressure if the predetermined state is when starting anti-skid control, or being the most recent target wheel cylinder pressure if the predetermined state is after starting the anti-skid control; and when the vehicle is in the predetermined state, sets a target wheel cylinder pressure of the second wheel of the vehicle to a value that is the same as the target wheel cylinder pressure of the first wheel of the vehicle, wherein the controller limits a change rate of the target wheel cylinder pressure of the second wheel within a predetermined range based on consideration of a previous target wheel cylinder pressure.

2. A braking control system according to claim 1, wherein the first wheel and the second wheel of the vehicle comprise a left wheel and a right wheel.

3. A braking control system according to claim 2, wherein the vehicle is in the predetermined state when the first wheel and the second wheel are anti-skid controlled.

4. A braking control system for a vehicle according to claim 2, wherein the first wheel and the second wheel comprise a rear-left wheel and a rear-right wheel.

5. A braking control system for a vehicle according to claim 1, further comprising:
a master cylinder;
a communication control valve provided between the master cylinder and the first and second linear valve assemblies; and
a high pressure source that supplies the working fluid at a high pressure to a passage between the communication control valve and the first and second linear valve assemblies; wherein:
the first and second linear valve assemblies are provided between the master cylinder and the corresponding wheel cylinders, and
the communication control valve is in a closed state at least when the controller starts a predetermined control for communication between the master cylinder and the first and second linear valve assemblies.

6. A braking control system for a vehicle according to claim 1, wherein each of the first and second linear valve assemblies comprises a first linear valve for increasing the corresponding wheel cylinder pressure, and a second linear valve for decreasing the corresponding wheel cylinder pressure.

7. A braking control system for a vehicle, comprising:
first and second actuators, each of which adjusts a pressing force of a corresponding friction member against a corresponding rotating member provided for corresponding first and second wheels of the vehicle; and
a controller that:
determines a target value of the pressing force applied to the first and second wheels in accordance with a state of the vehicle, and controls the first and second actuators to set the pressing force to the determined target value;
determines a target pressing force applied to the first wheel on the basis of a rotating state of the first wheel when the vehicle is in a predetermined state, wherein the target pressing force applied to the first wheel equals a pressing force plus a target pressing force slope multiplied by cycle time, the pressing force being the wheel cylinder pressing force if the predetermined state is when starting anti-skid control, or being the most recent target pressing force if the predetermined state is after starting the anti-skid control; and when the vehicle is in the predetermined state, sets a target pressing force of the second wheel to the target pressing force applied to the first wheel, wherein the controller limits a change rate of the target pressing force applied to the second wheel within a predetermined range based on consideration of a previous target wheel cylinder pressure.

8. A braking control system according to claim 7, wherein each of the first and second actuators comprises an electromagnetic actuator.

9. A braking control system according to claim 7, wherein the first wheel and the second wheel of the vehicle comprise a left wheel and a right wheel.

10. A braking control system according to claim 9, wherein the vehicle is in the predetermined state when the first wheel and the second wheel are anti-skid controlled.

11. A braking control system according to claim 9, wherein the first wheel and the second wheel comprise a rear-left wheel and a rear-right wheel.

12. A braking control method for a vehicle having first and second linear valve assemblies, each of which adjusts a wheel cylinder pressure of a corresponding wheel cylinder provided for first and second wheels of the vehicle by controlling supply and discharge of a working fluid to and from the corresponding wheel cylinder, the method comprising:
determining a target value of the wheel cylinder pressure of the first and second wheels in accordance with a state of the vehicle, so as to control the first and second linear valve assemblies such that the wheel cylinder pressure of the first and second wheels becomes equal to the determined target value;
determining a target wheel cylinder pressure of the first wheel of the vehicle on the basis of a rotating state of the first wheel when the vehicle is in a predetermined state, wherein the target wheel cylinder pressure of the first wheel equals a pressure plus a target pressure slope multiplied by cycle time, the pressure being the wheel cylinder pressure if the predetermined state is when starting anti-skid control, or being the most recent target wheel cylinder pressure if the predetermined state is after starting the anti-skid control; and
when the vehicle is in the predetermined state, setting a target wheel cylinder pressure of the second wheel of the vehicle to a value that is the same as the target wheel cylinder pressure of the first wheel of the vehicle, wherein a change rate of the target wheel cylinder pressure of the second wheel is limited to be within a predetermined range based on consideration of a previous target wheel cylinder pressure.

13. A method according to claim 12, wherein the first wheel and the second wheel of the vehicle comprise a left wheel and a right wheel.

14. A method according to claim 13, wherein the vehicle is in the predetermined state when the first wheel and the second wheel are anti-skid controlled.

15. A method according to claim 13, wherein the first wheel and the second wheel comprise a rear-left wheel and a rear-right wheel.

16. A braking control method for a vehicle having first and second actuators, each of which adjusts a pressing force of a corresponding friction member against a corresponding rotating member provided for corresponding first and second wheels of the vehicle, the method comprising:

determining a target value of the pressing force applied to the first and second wheels in accordance with a state of the vehicle, so as to control the first and second actuators to set the pressing force to the determined target value;

determining a target pressing force applied to the first wheel on the basis of a rotating state of the first wheel when the vehicle is in a predetermined state, wherein the target pressing force applied to the first wheel equals a pressing force plus a target pressing force slope multiplied by cycle time, the pressing force being the wheel cylinder pressing force if the predetermined state is when starting anti-skid control, or being the most recent target pressing force if the predetermined state is after starting the anti-skid control; and when the vehicle is in the predetermined state, setting a target pressing force of the second wheel to the target pressing force applied to the first wheel, wherein a change rate of the target pressing force applied to the second wheel is limited to be within a predetermined range based on consideration of a previous target wheel cylinder pressure.

17. A method according to claim 16, wherein each of the first and second actuators comprises an electromagnetic actuator.

18. A method according to claim 16, wherein the first wheel and the second wheel of the vehicle comprise a left wheel and a right wheel.

19. A method according to claim 18, wherein the vehicle is in the predetermined state when the first wheel and the second wheel are anti-skid controlled.

20. A method according to claim 18, wherein the first wheel and the second wheel comprise a rear-left wheel and a rear-right wheel.

21. The braking control system according to claim 1, wherein the controller controls the target wheel cylinder pressure based upon at least one of a vehicle deceleration and a braking slip amount.

22. The braking system according to claim 8, wherein the controller controls the target pressing force based upon at least one of a vehicle deceleration and a braking slip amount.

23. The method according to claim 12, wherein the target wheel cylinder pressure is controlled based upon at least one of a vehicle deceleration and a braking slip amount.

24. The method according to claim 16, wherein the target pressing force is controlled based upon at least one of a vehicle deceleration and a braking slip amount.

25. The braking control system according to claim 1, wherein the target wheel cylinder pressure of the first and second wheels equals a final target deceleration multiplied by a respective coefficient of the first and second wheels.

26. The braking control system according to claim 25, wherein the final target deceleration equals a weight multiplied by a first target deceleration plus unity minus the weight multiplied by a second target deceleration, and the weight ranges between zero and unity, inclusive.

27. The braking control system according to claim 26, wherein the first target deceleration is based on a depression stroke, and the second target deceleration is based on a mean pressure of master cylinders.

28. The method according to claim 12, wherein, the target wheel cylinder pressure of the first and second wheels equals a final target deceleration multiplied by a respective coefficient of the first and second wheels.

29. The method according to claim 28, wherein the final target deceleration equals a weight multiplied by a first target deceleration plus unity minus the weight multiplied by a second target deceleration, and the weight ranges between zero and unity, inclusive.

30. The method according to claim 29, wherein the first target deceleration is based on a depression stroke, and the second target deceleration is based on a mean pressure of master cylinders.

* * * * *